(12) United States Patent (10) Patent No.: US 9,404,249 B2
Langone et al. (45) Date of Patent: Aug. 2, 2016

(54) ULTRA LIGHT FIBER PLACED TRUSS

(71) Applicants: Robert J. Langone, Clifton Park, NY (US); Michael S. Silver, Brooklyn, NY (US)

(72) Inventors: Robert J. Langone, Clifton Park, NY (US); Michael S. Silver, Brooklyn, NY (US)

(73) Assignee: ADC ACQUISITION COMPANY, Schenectady, NY (US)

( * ) Notice: Subject to any disclaimer, the term of this patent is extended or adjusted under 35 U.S.C. 154(b) by 0 days.

(21) Appl. No.: 13/743,872

(22) Filed: Jan. 17, 2013

(65) Prior Publication Data

US 2013/0180194 A1 Jul. 18, 2013

Related U.S. Application Data

(60) Provisional application No. 61/587,832, filed on Jan. 18, 2012.

(51) Int. Cl.
*E04B 1/30* (2006.01)
*E04C 5/07* (2006.01)
*B29C 70/32* (2006.01)
*E04C 3/28* (2006.01)

(52) U.S. Cl.
CPC . *E04B 1/30* (2013.01); *B29C 70/32* (2013.01); *E04C 3/28* (2013.01); *E04C 5/07* (2013.01)

(58) Field of Classification Search
CPC .............. E04C 5/07; E04C 3/28; E04C 3/29; E04B 1/30; B29C 70/08; B29C 53/585; B29C 63/08; B29C 70/32
USPC ..................................................... 52/309.13
See application file for complete search history.

(56) References Cited

U.S. PATENT DOCUMENTS

| 2,375,921 | A | * | 5/1945 | Hirsh | 138/140 |
|---|---|---|---|---|---|
| 2,969,812 | A | * | 1/1961 | De Ganahl | 285/238 |
| 3,429,758 | A | * | 2/1969 | Young | 156/79 |
| 3,466,219 | A | * | 9/1969 | Schwartz | 428/68 |
| 3,501,880 | A | * | 3/1970 | Bosch | 52/222 |
| 4,020,202 | A | * | 4/1977 | Kreft | 428/33 |
| 4,038,118 | A | * | 7/1977 | James | 156/143 |
| 4,266,579 | A | * | 5/1981 | Deiss | 138/127 |
| 4,282,764 | A | * | 8/1981 | Harris | 74/424.75 |
| 4,566,247 | A | * | 1/1986 | Overbo | 52/843 |
| 4,653,216 | A | * | 3/1987 | Inoue | 43/18.5 |
| 4,677,020 | A | * | 6/1987 | Takagi et al. | 428/300.7 |
| 4,786,341 | A | * | 11/1988 | Kobatake et al. | 156/71 |
| 5,454,795 | A | * | 10/1995 | Samson | 604/526 |
| 5,458,943 | A | * | 10/1995 | Taylor | 428/34 |
| 5,487,806 | A | * | 1/1996 | Viellard | 156/175 |
| 5,592,771 | A | * | 1/1997 | Kim | 43/18.1 R |
| 5,657,595 | A | * | 8/1997 | Fyfe et al. | 52/252 |
| 5,783,279 | A | * | 7/1998 | Edgson et al. | 428/116 |
| 5,811,051 | A | * | 9/1998 | Kikuchi et al. | 264/409 |
| 5,876,544 | A | * | 3/1999 | Yamamoto | A63B 53/10 156/171 |
| 5,995,702 | A | * | 11/1999 | Tjønneland | 385/115 |
| 6,016,848 | A | * | 1/2000 | Egres, Jr. | 138/137 |
| 6,219,991 | B1 | * | 4/2001 | Salek-Nejad | 52/741.3 |

(Continued)

*Primary Examiner* — Brian Glessner
*Assistant Examiner* — Joshua Ihezie
(74) *Attorney, Agent, or Firm* — Maxine L. Barasch; Keohane & D'Alessandro PLLC

(57) ABSTRACT

A novel composite beam is disclosed. The composite beam may comprise variations in the surface that can be used to create open and closed surfaces for the modulation of natural light. The composite beam may also be optimized for the applied loads by placing the fibers in the direction of the applied loads and/or increasing the fiber density in the regions of higher loads.

18 Claims, 8 Drawing Sheets

(56) References Cited

U.S. PATENT DOCUMENTS

| | | | |
|---|---|---|---|
| 6,439,268 B2 * | 8/2002 | Niki et al. | 138/126 |
| 6,464,591 B1 * | 10/2002 | Nakajima | 464/181 |
| 6,833,656 B2 * | 12/2004 | Hooley et al. | 310/369 |
| 7,106,156 B2 * | 9/2006 | Buczek et al. | 335/216 |
| 7,132,027 B2 * | 11/2006 | Jensen | 156/175 |
| 8,082,954 B2 * | 12/2011 | Rytter | 138/126 |
| 8,105,523 B2 * | 1/2012 | Edelmann et al. | 264/258 |
| 8,127,800 B2 * | 3/2012 | Ramaswamy et al. | 138/149 |
| 8,147,937 B2 * | 4/2012 | Brisson et al. | 428/36.3 |
| 8,313,600 B2 * | 11/2012 | Wilson et al. | 156/175 |
| 8,444,900 B2 * | 5/2013 | Wilson et al. | 264/258 |
| 2002/0003046 A1 * | 1/2002 | Clouet et al. | 174/108 |
| 2002/0042236 A1 * | 4/2002 | Nobuhara et al. | 442/327 |
| 2002/0042645 A1 * | 4/2002 | Shannon | 623/1.13 |
| 2003/0095678 A1 * | 5/2003 | Hooley et al. | 381/353 |
| 2005/0076596 A1 * | 4/2005 | Igarashi | 52/514 |
| 2007/0119512 A1 * | 5/2007 | Rytter | 138/126 |
| 2009/0098324 A1 * | 4/2009 | Hasegawa et al. | 428/36.4 |
| 2009/0260420 A1 * | 10/2009 | Stevenson | 73/23.41 |
| 2010/0304097 A1 * | 12/2010 | Nokleby et al. | 428/195.1 |
| 2011/0114215 A1 * | 5/2011 | Jeruzal et al. | 138/150 |
| 2011/0132486 A1 * | 6/2011 | Martin | 138/177 |
| 2011/0204064 A1 * | 8/2011 | Crane et al. | 220/592 |
| 2012/0060826 A1 * | 3/2012 | Weisenberger | 126/569 |
| 2012/0305173 A1 * | 12/2012 | Masson et al. | 156/185 |

* cited by examiner

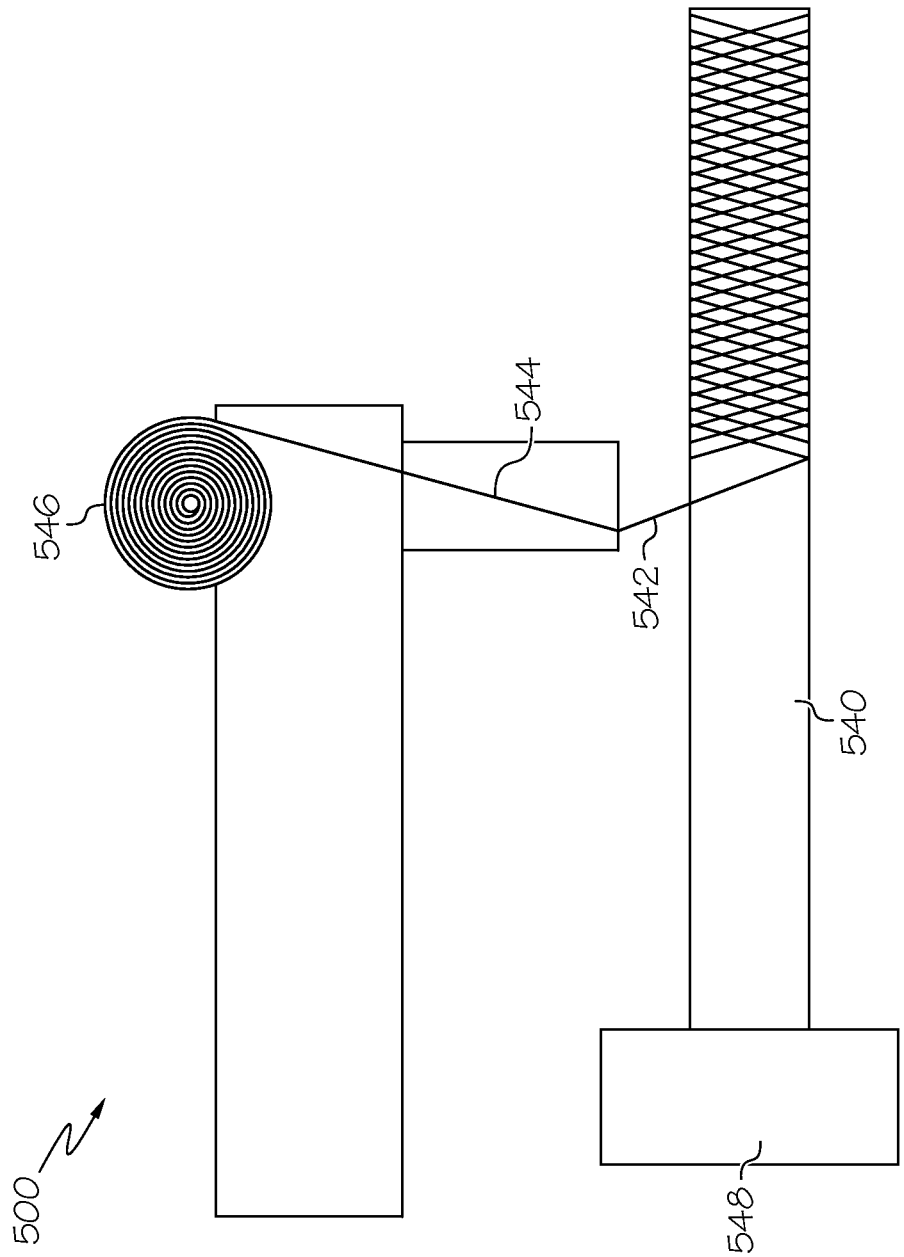

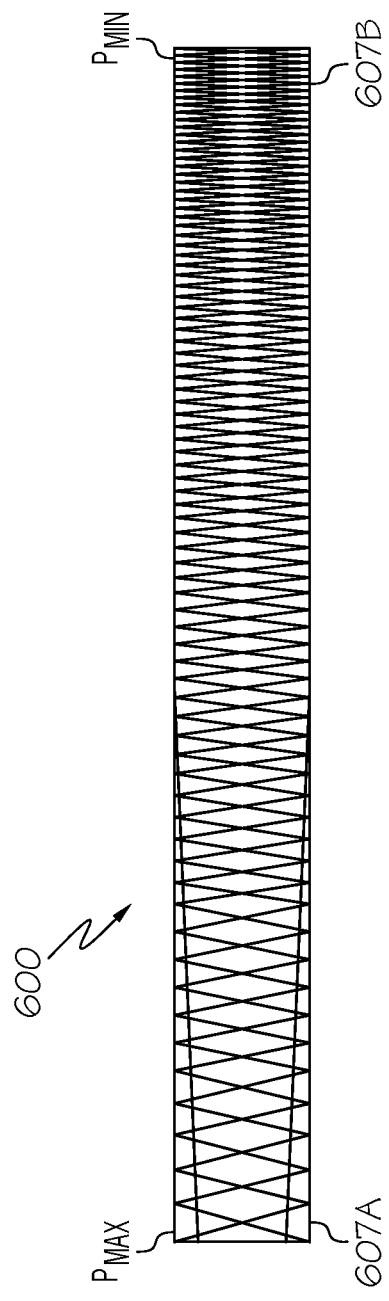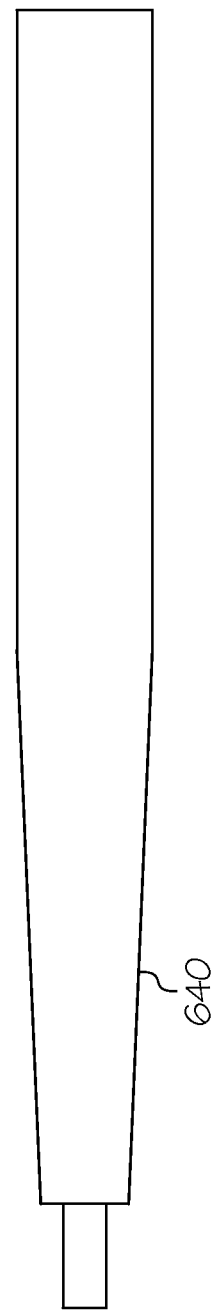
FIG. 6A
FIG. 6B

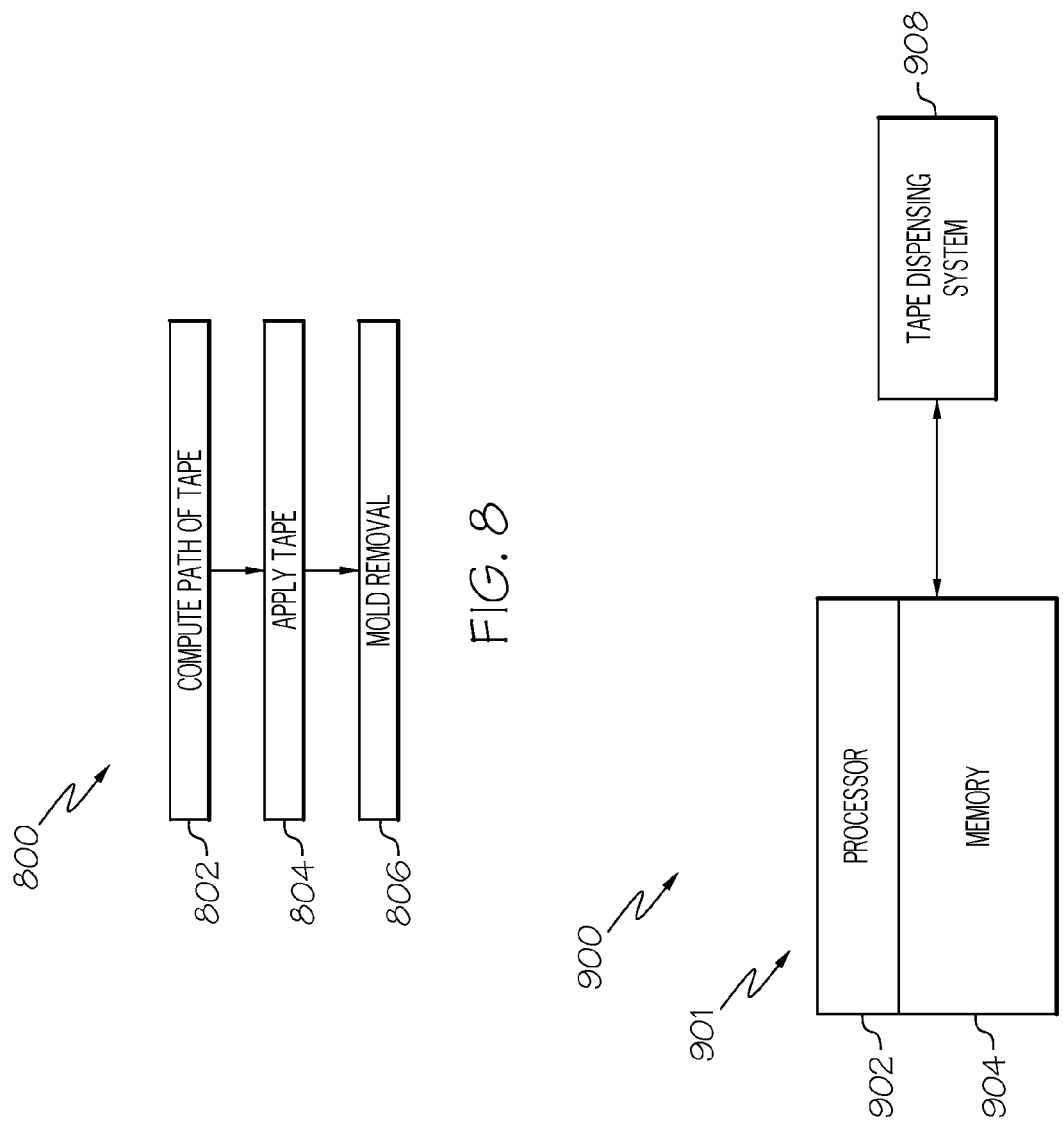

ULTRA LIGHT FIBER PLACED TRUSS

CROSS-REFERENCE TO RELATED APPLICATIONS

This application claims priority to U.S. Provisional Patent Application Ser. No. 61/587,832 filed on Jan. 18, 2012, the entire contents of which are incorporated herein by reference.

BACKGROUND

Composite structures comprise high strength fibers held together in a matrix of thermoset or thermoplastic resin. A panel made from these materials is typically 1.5 times stronger and 7 times lighter than the same panel made of steel. It is therefore desirable to have improvements in composite structures to facilitate their increased use in various applications.

FIELD OF THE INVENTION

The present invention relates generally to building materials and, more particularly, to composite beams.

SUMMARY

Embodiments of the present invention provide a novel composite beam that is well-suited for use in construction of building structures. The composite beam is often many times lighter than a beam of conventional materials such as concrete or steel, while offering improved strength characteristics. Beams can be assembled into a series of joined units to form complete long span support systems such as for roofing applications. Each truss can be mass customized allowing variations in the surface that can be used to create open and closed surfaces for the modulation of natural light. Such customized fiber architectures can be optimized for the applied loads by placing the fibers in the direction of the applied loads and/or increasing the fiber density in the regions of higher loads. The system is lighter and stronger than conventional construction systems.

In one embodiment, a beam is provided, having a first end and a second end, and comprising a plurality of composite tape windings arranged with a varying pitch along the length of the beam.

In another embodiment, a beam is provided, the beam comprising: a first portion having a first cross section; a second portion having a second cross section; and a third portion having a third cross section, wherein the beam is comprised of multiple composite tape windings.

In another embodiment, a beam is provided, the beam comprising: a first portion having a first cross section; and a second portion having a second cross section, wherein the beam is comprised of multiple composite tape windings, and wherein the composite tape windings comprise thermoplastic impregnated fibers.

BRIEF DESCRIPTION OF THE DRAWINGS

These and other features of this invention will be more readily understood from the following detailed description of the various aspects of the invention taken in conjunction with the accompanying drawings in which:

FIG. 5 shows a view of a composite beam during the fabrication process.

FIG. 6A shows a view of a composite beam in accordance with an additional embodiment of the present invention.

FIG. 6B shows an example of a winding mold.

FIG. 8 is a flowchart indicating process steps for fabrication of a composite beam in accordance with an embodiment of the present invention.

FIG. 9 is a block diagram of a system for fabrication of a composite beam in accordance with an embodiment of the present invention.

DETAILED DESCRIPTION

Figure 1:
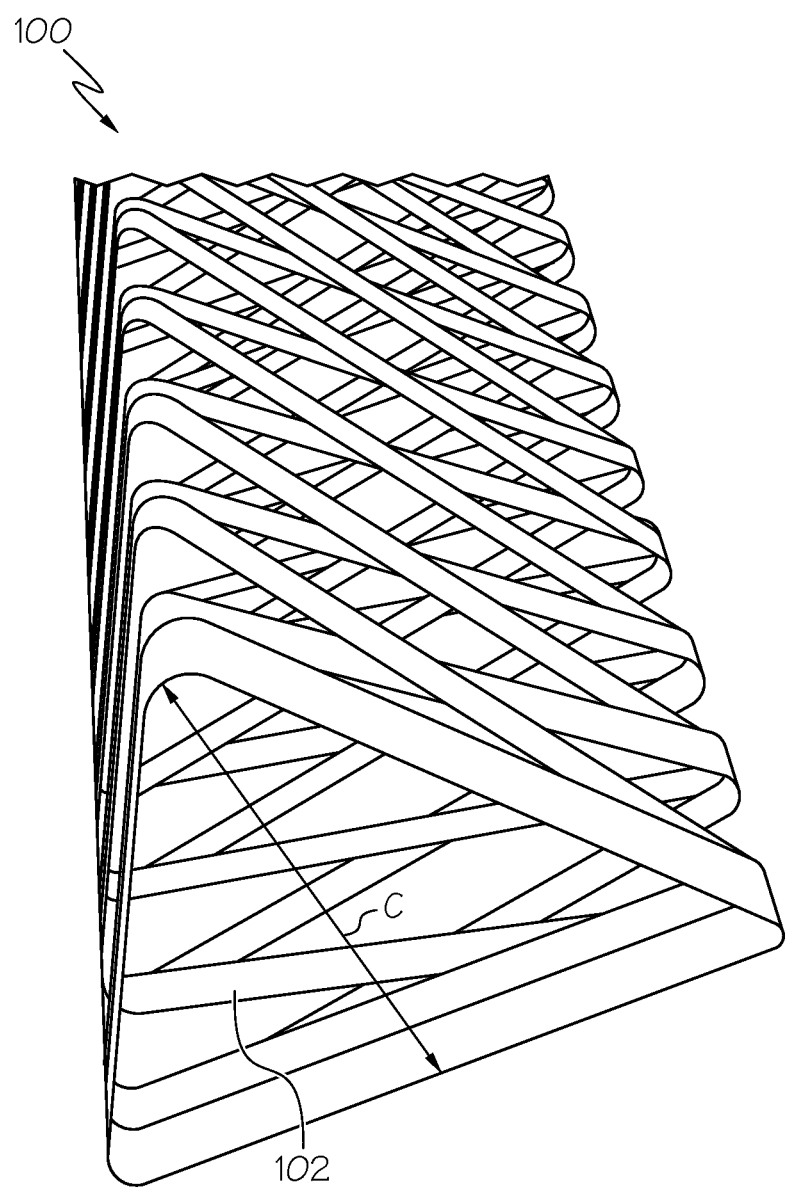
FIG. 1 shows a perspective view of a composite beam in accordance with an embodiment of the present invention.

FIG. 1 shows a perspective view of a composite beam 100 in accordance with an embodiment of the present invention. Beam 100 is comprised of one or more composite tape windings 102. "Windings" is used herein interchangeably with "strips". The tape windings may be S-glass tape strips or plies, or any other suitable material. In some embodiments, the composite tape may be translucent. The tape windings are arranged to form a triangular cross-section C. The tape windings may be arranged via Computer Automated Fiber Placement technology (AFP). AFP is a relatively new fabrication process that provides fundamental changes in the way people think about space, structure, and program. Fiber placement machines employ a robotically controlled taping head to lay down fiber reinforced plastic strips on a reusable mold or "mandrel". Because the forms AFP creates are incredibly strong, rigid, and corrosion resistant, they are also able to handle dynamic mechanical loads without the need for an independent structural armature.

Figure 2:
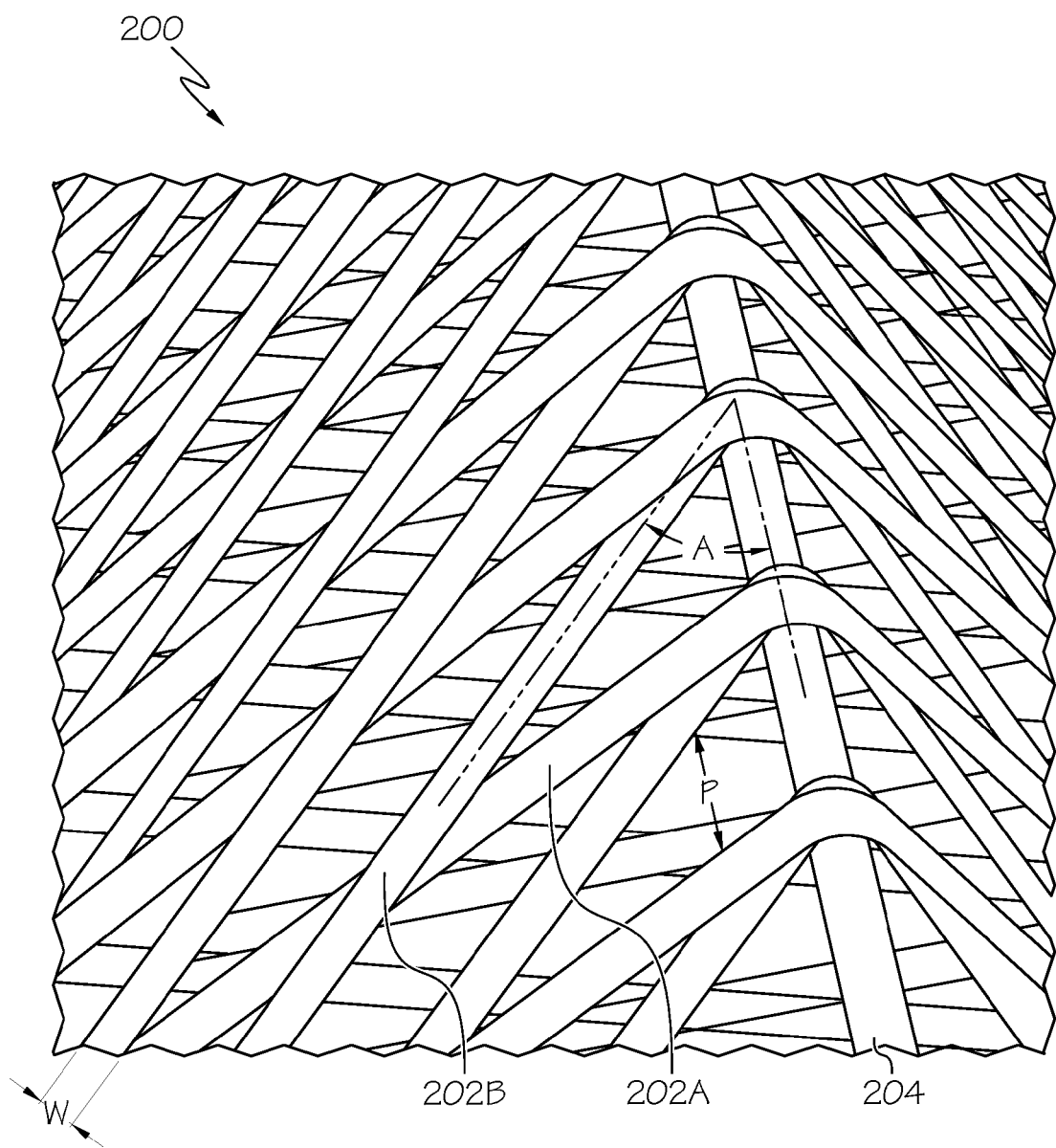
FIG. 2 shows a detailed view of an alternative embodiment of a composite beam.

FIG. 2 shows a detailed view of an alternative embodiment of a composite beam 200. Reinforcing tape strip 204 travels longitudinally along the beam length, serving as a reinforced edge. Multiple tape windings (indicated as 202A and 202B) form the cross-sectional shape of the beam. While the embodiment shown has a triangular cross section, other shapes are possible, such as square, circular, or rectangular, as well as other shapes, all of which are included within the scope of the invention. Some embodiments may have non-constant cross-sections. Each winding is wound with a pitch P, which indicates the spacing between successive windings of the material. In some embodiments, the pitch P may vary over the length of the beam. Each winding is placed with reinforcing angle A, which is the angle of a winding relative to reinforcing tape strip 204. The pitch P and angle A can be varied to create composite beams for various applications. In some embodiments, a beam may have multiple portions, where each portion may vary the reinforcing angle and/or pitch. In some embodiments, the beam has a first portion with a reinforcing angle ranging from about 72 degrees to about 80 degrees, and a second portion has an angle ranging from about 60 degrees to about 68 degrees. In some embodiments, the beam has a first portion with a pitch ranging from about 0.125 inches to about 1 inch, and a second portion has a pitch ranging from about 1.5 inches to about 2 inches.

In some embodiments, the width W of winding 202B may range from about 0.25 inch to about 1 inch. In some embodiments, the pitch P may range from about 3 inches at its maximum to about 0.125 inch at its minimum. In some embodiments, the widest pitch of the beam may be between 3 to 4 times the width W of a winding. In some embodiments, the smallest pitch of the beam may be between 0.1 to 0.5 times the width W of a winding. In some embodiments, the angle A may range from about 45 degrees to about 80 degrees. In some embodiments, the angle A may range from about 65 degrees to about 80 degrees. In some embodiments, the beam 200 may have a constant reinforcing angle A throughout the length of the beam. In other embodiments, the beam may have a reinforcing angle A that varies along the length of the beam. A higher value for reinforcing angle A may be used in conjunction with a narrower pitch P, and a lower value for reinforcing angle A may be used in conjunction with a wider pitch P. For example, a beam may have a first section with a pitch P of 3 inches and a reinforcing angle A of 65 degrees, and a second section with a pitch P of 1 inch and an angle A of 80 degrees. The narrower pitch P and larger angle A result in more tape windings per unit area in the second section, which increases the strength of that section. The wider pitch P and smaller reinforcing angle A result in less tape windings per beam unit area in the first section, which increases the amount of light that can pass through that section of a beam.

Figure 3A:
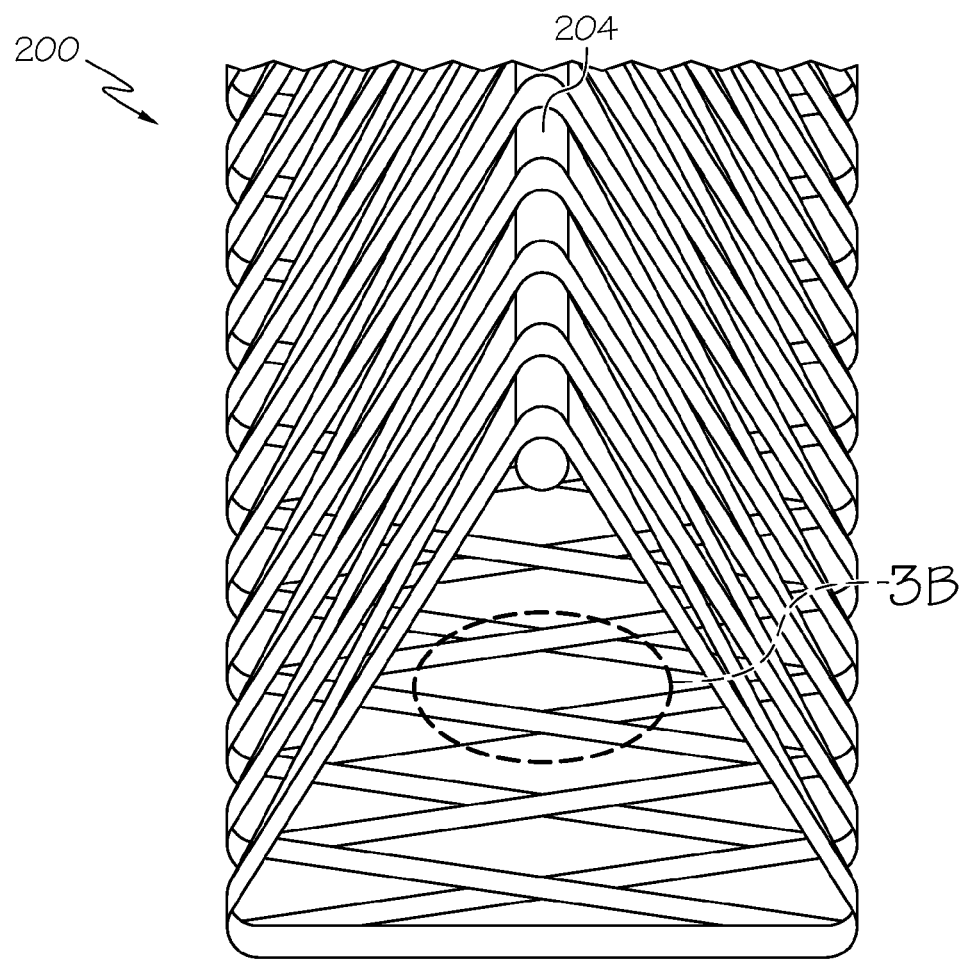
FIG. 3A shows an end view of the embodiment of FIG. 2.
Figure 3B:
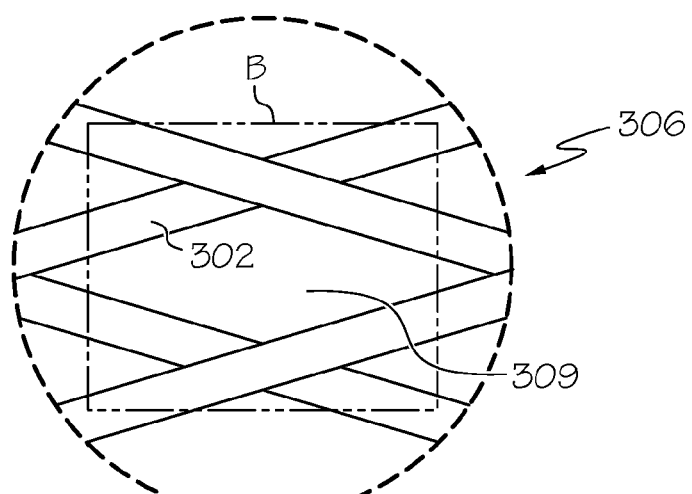
FIG. 3B shows detail of FIG. 3A.

FIG. 3A shows an end view of the composite beam 200 of FIG. 2. In this view, the crossing pattern 306 of two tape strips is visible. The close-up view of FIG. 3B shows the pattern 306 creates a void 309 where no winding material exists. Unlike beams of conventional manufacture, where material is actively removed by drilling or punching, beams in accordance with embodiments of the present invention only use the material that is required. Hence, if voids are specified as part of the design of a beam in accordance with embodiments of the present invention, no additional material is wasted to form the desired voids.

For a given area B, a percentage of the area T is occupied by tape windings 302, and a percentage of the area V is occupied by voids 309. The beam tape density, which is the amount of tape per unit area of beam, is defined by T/B, where B is the total unit area, and T is the amount of beam area occupied by tape windings (strips). When a unit area is completely occupied by tape, T=B, and the beam tape density is 1. With more voids, the tape density is less than one. The lower the tape density, the more light is able to pass through that area of the beam. In some embodiments, the tape density of a beam may range from about 0.2 to 1. In other embodiments, the tape density of a beam may range from about 0.4 to about 0.8. When designing a beam, considerations for choosing a beam tape density for a given section of beam include considering the weight support requirements for the beam, and the desired amount of light that can pass through the beam. Ventilation needs may also be considered, as more air can pass through sections of beam with lower beam tape density.

Figure 4:
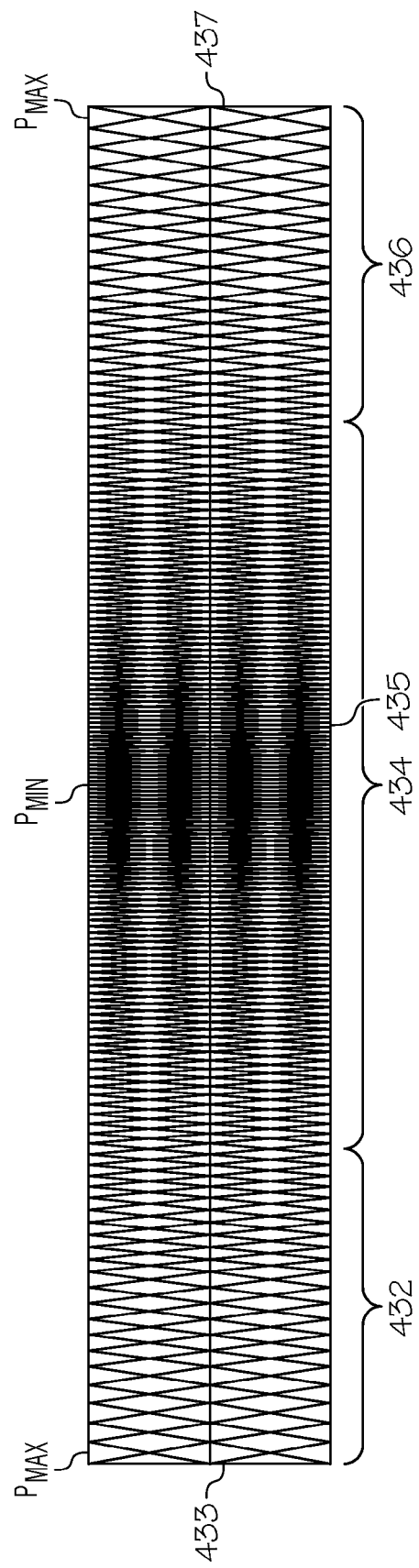
FIG. 4 shows a view of a composite beam in accordance with an additional embodiment of the present invention.

FIG. 4 shows a view of a composite beam 400 in accordance with an additional embodiment of the present invention. In this embodiment, the pitch varies from a maximum pitch Pmax at each end of beam 400 to a minimum pitch Pmin in the middle of the beam. Hence, the beam can be divided into multiple sections or regions, each having different tape densities (the amount of tape per unit area). End regions 432 and 436 have a wider pitch than middle section 434. The variation in pitch can be used to achieve certain architectural and/or aesthetic design goals. For example a wider pitch can be used reduce the beam tape density, and allow light to pass through the beam, whereas a smaller pitch (higher beam tape density) can be used when it is desirable to restrict light. Likewise, a smaller pitch may be used where structural load requirements are greater.

In some embodiments, beam 400 may have three beam tape density regions (432, 434, and 436). The end regions 432 and 436 may have an average beam tape density that is lower than middle section 434. In some embodiments, the beam tape density may continuously vary throughout the length of the beam. For example, in beam 400, the beam tape density increases from a minimum value at end 433 to a maximum value at midpoint 435, which is equidistant between end 433 and end 437, and then back to the minimum value at end 437. In some embodiments, the maximum beam tape density value is 1, meaning completely occupied by tape, with no voids in that area.

FIG. 5 shows a view of a composite beam during a representative fabrication process. A fabrication system 500 applies individual fiber "tows" or windings using a computer-numerically controlled robotic taping head. Thermoplastic impregnated fibers are melted together by a heating element that travels over a preformed shape. When the part is cooled, it is removed from the mold. Using computer aided design (CAD) data, a part's fiber orientation can be designed to exact structural specifications. Fabrication system 500 comprises a mandrel 540. The mandrel is a metal tool or mold used as a surface to lay down the strips of fiber reinforced composite tape 542. In some embodiments, "shapeable" mandrels may be used to 'mass customize' complex forms in a single production run. Altering tape geometries on the fly is another way to produce variable components from a single tool. A robotic gantry mechanism 544 is used to apply the tape 542 to the mandrel 540 as the mandrel is rotated by chuck 548 which is driven by a computer-controlled motor (not shown). Tape is supplied from spool 546. While FIG. 5 illustrates an exemplary embodiment, it will be obvious to one skilled in the art that other suitable fabrication means may be used to place suitable reinforcements in the desired patterns to achieve the innovative truss structure. Such other suitable fabrication means include different fiber placement mechanisms and different materials.

FIG. 6A shows a view of a composite beam 600 in accordance with an additional embodiment of the present invention. In this embodiment, the widest pitch Pmax is at one end of the beam, indicated by end 607A. The pitch gradually decreases towards the other end 607B of the beam, at which point, the pitch is the smallest (Pmin). Increased fiber plies in a section allow for a less densely packed fiber layout in elevation. This strategy of reciprocation also helps reduce surface buckling. FIG. 6B shows a winding mold 640 used for making beam 600 of FIG. 6A.

Figure 7:
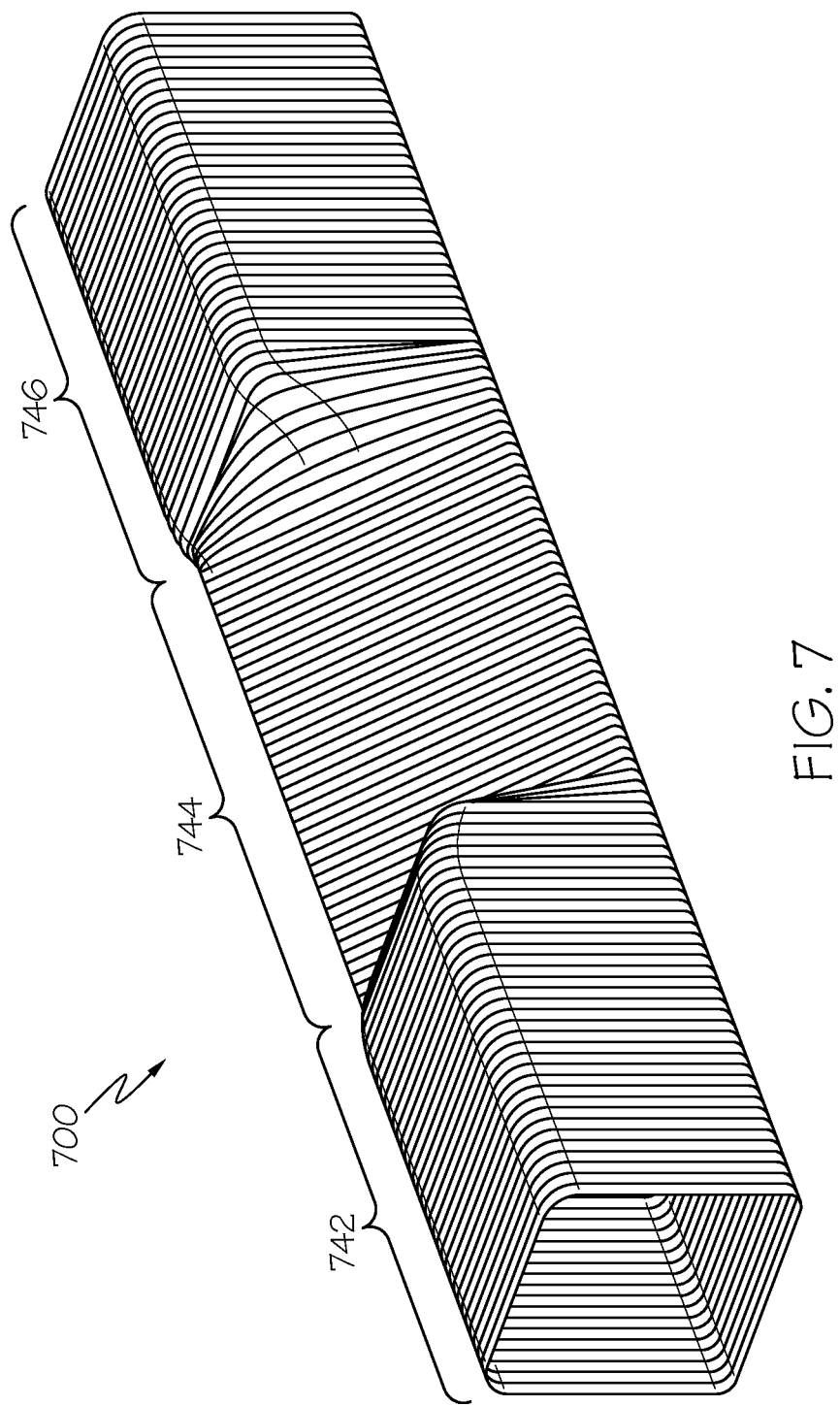
FIG. 7 shows a view of a composite beam in accordance with an additional embodiment of the present invention.

FIG. 7 shows a view of a composite beam 700 in accordance with an additional embodiment of the present invention. In this embodiment, the beam has a varying cross section. The beam has three logical regions (portions): end regions 742 and 746, and middle region 744. The end regions 742 and 746 have a square cross section, and middle region 744 has a triangular cross-section. The cross-section shape gradually transitions at the intersection of the middle section 744 with each neighboring end section (742, 746). In another embodiment, the middle region 744 is circular instead of triangular. Any feasible shape of each section is included within the scope of the invention.

FIG. 8 is a flowchart 800 indicating process steps for fabrication of a composite beam in accordance with an embodiment of the present invention. In process step 802, the path of the tape is computed. This step may be performed via a computer executing a software program. The software program may take in to account various design goals such as cost, required strength, the anticipated load type and direction on the beam, and aesthetic issues such as appearance and translucency. Once the path of the tape is computed, the tape is applied in step 804, for example, by using a system such as that shown in FIG. 5. The tape is applied to a mold or mandrel.

Then, once the tape application step 804 is complete, the mold (or mandrel) is removed in process step 806, leaving the composite beam intact.

FIG. 9 is a block diagram of a system 900 for fabrication of a composite beam in accordance with an embodiment of the present invention. System 900 comprises a computer 901. Computer 901 comprises a processor 902 and memory 904. Memory 904 may comprise flash memory or other non-volatile storage technology. Memory 904 contains machine instructions, that when executed by processor 902, communicate with tape dispensing system 908 to apply strips of tape to a mandrel or mold. Memory 904 may also contain machine instructions, that when executed by processor 902, compute the desired path of the tape based on design requirements for the particular beam that is being fabricated.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A beam comprising:
    a first portion comprising a first cross section;
    a second portion comprising a second cross section; a third portion comprising a third cross section; and multiple composite tape windings,
    wherein each of the first cross section, the second cross section,
    and the third cross section are hollow and completely empty,
    wherein the first cross section is square, the second cross section is triangular, and
    the third cross section is square, and
    wherein the second cross section is positioned between the first cross section and the third cross section.

2. The beam of claim 1, wherein the first cross section and the third cross section each comprise a first beam tape density, and the second cross section comprises a second beam tape density.

3. The beam of claim 2, wherein the second beam tape density is less than the first beam tape density.

4. The beam of claim 3, wherein the first beam tape density is 1, and the second beam tape density ranges from about 0.5 to about 0.75.

5. The beam of claim 1, wherein the multiple composite tape windings transition gradually from the first cross section to the second cross section, and wherein the multiple composite tape windings transition gradually from the second cross section to the third cross section.

6. A beam comprising:
    A first portion comprising a first cross section, a second portion comprising a second cross section, and a third portion comprising a third cross section,
    wherein each of the first cross section, the second cross section, and the third cross section are hollow and completely empty,
    wherein the first cross section is square, the second cross section is triangular, and the third cross section is square, and
    wherein the second cross section is positioned between the first cross section and the third cross section; and
    multiple composite tape windings forming the first portion, the second portion, and the third portion,
    wherein the multiple composite tape windings have a continuously varying tape pitch,
    wherein the multiple composite tape windings comprise a maximum tape pitch at a first end of the beam, and a minimum tape pitch at a second end of the beam, and
    wherein the continuously varying tape pitch continuously decreases from the first end towards the second end.

7. The beam of claim 6 wherein the continuously varying tape pitch ranges from about 0.125 inch to about 3 inches.

8. The beam of claim 6, wherein each winding has a tape width, and wherein the maximum tape pitch is between 3 times to 4 times the tape width.

9. The beam of claim 6, wherein each winding has a tape width, and wherein the minimum tape pitch is between 0.1 times to 0.5 times the tape width.

10. The beam of claim 6, comprising a tape density ranging from about 0.2 to 1.

11. The beam of claim 6, comprising a tape density ranging from about 0.4 to about 0.8.

12. The beam of claim 6, wherein the multiple composite tape windings transition gradually from the first cross section to the second cross section, and wherein the multiple composite tape windings transition gradually from the second cross section to the third cross section.

13. The beam of claim 12, wherein the beam is a rigid integral one-piece construction beam.

14. A beam comprising:
    a first portion comprising a first cross section, a second portion comprising a second cross section, and a third portion comprising a third cross section,
    wherein each of the first cross section, the second cross section, and the third cross section are hollow and completely empty,
    wherein the first cross section is square, the second cross section is triangular, and the third cross section is square, and
    wherein the second cross section is positioned between the first cross section and the third cross section; and
    multiple composite tape windings forming the first portion, the second portion, and the third portion,
    wherein the multiple composite tape windings have a continuously varying tape pitch,
    wherein the multiple composite tape windings comprise a maximum tape pitch at each of a first end of the beam and a second end of the beam, and a minimum tape pitch at a midpoint of the beam,
    wherein the continuously varying tape pitch continuously decreases from the first end towards the midpoint of the beam, and the continuously varying tape pitch continuously increases from the midpoint of the beam towards the second end.

15. The beam of claim 14, comprising a maximum tape density at the midpoint of the beam.

16. The beam of claim 14, comprising a tape density ranging from about 0.2 to 1.

17. The beam of claim 14, wherein the multiple composite tape windings transition gradually from the first cross section to the second cross section, and wherein the multiple composite tape windings transition gradually from the second cross section to the third cross section.

18. The beam, of claim 17, wherein the beam is a rigid integral one-piece construction beam.

* * * * *